United States Patent [19]
Patecell

[11] 4,270,592
[45] Jun. 2, 1981

[54] UNITARY RUN-FLAT SYSTEMS FOR INFLATABLE TIRES AND LOCK MEANS

[76] Inventor: Theodore C. Patecell, 33-52 156th St., Flushing, N.Y. 11354

[21] Appl. No.: 18,853

[22] Filed: Mar. 8, 1979

Related U.S. Application Data

[63] Continuation of Ser. No. 774,762, Mar. 7, 1977, abandoned.

[51] Int. Cl.³ .............................................. B60C 17/04
[52] U.S. Cl. .................................................... 152/158
[58] Field of Search ................ 152/158, 152, 330 RF, 152/381.1, 381.2; 24/230.5 R, 230.5 W, 201 HE, 201 L; 403/292, 260, 258, 231; 85/36

[56] References Cited
U.S. PATENT DOCUMENTS

| | | | |
|---|---|---|---|
| 1,820,857 | 8/1931 | Wilson | 152/381.1 |
| 2,241,858 | 5/1941 | Hruska | 152/158 |
| 3,872,907 | 3/1975 | Curtiss, Jr. et al. | 152/158 |
| 3,889,734 | 6/1975 | Owsen | 152/158 |
| 3,976,114 | 8/1976 | Patecell | 152/158 |
| 3,990,491 | 11/1976 | Hampshire et al. | 152/158 |

*Primary Examiner*—Randolph A. Reese
*Assistant Examiner*—D. W. Underwood
*Attorney, Agent, or Firm*—Howard E. Thompson, Jr.

[57] ABSTRACT

A unitary run-flat insert for inflatable tires is provided in the form of a split ring having sufficient flexibility, through separation at the split portion thereof, to pass over the rim flanges of a tire mounting rim and having an inner periphery closely and circumferentially engaging the rim when the split portion is closed, with lock means at said split portion adapted for automatic engagement as the ends forming said split portion are moved into juxtapositioned alignment. As closed by the lock means, the insert engages the rim in a manner to rotate therewith in normal operation, but to slip circumferentially thereof when riding on a deflated tire. The flexibility required can be provided by fashioning the insert from material having sufficient deformability to permit flexing of the full cross-section of the insert or, when less deformable material is needed for load bearing purposes, the insert can be provided with a plurality of slits, circumferentially spaced and extending part way through the radial dimension. The unitary insert can have a substantial radial dimension when intended for load bearing under run-flat conditions, or can have a smaller, non-load bearing radial dimension when intended primarily to maintain bead-seating between the tire and rim under run-flat conditions, thereby facilitating the use of standard, one-piece drop center wheels with tires especially designed for "run-flat operation", and which provide their own load bearing support when running flat.

24 Claims, 19 Drawing Figures

UNITARY RUN-FLAT SYSTEMS FOR INFLATABLE TIRES AND LOCK MEANS

This is a continuation, of application Ser. No. 774,762, filed Mar. 7, 1977 and now abandoned.

THE INVENTION

This invention relates to a unitary run-flat insert for inflatable tires in the form of a split ring having sufficient flexibility, through separation at the split portion thereof, to pass over the rim flanges of a tire mounting rim and having an inner periphery closely and circumferentially engaging the rim when the split portion is closed, with lock means at said split portion adapted for automatic engagement as the ends forming said split portion are moved into juxtapositioned alignment. As closed by the lock means, the insert engages the rim in a manner to rotate therewith in normal operation, but to slip circumferentially thereof when riding on a deflated tire. The flexibility required can be provided by fashioning the insert from material having sufficient deformability to permit flexing of the full cross-section of the insert or, when less deformable material is needed for load bearing purposes, the insert can be provided with a plurality of slits, circumferentially spaced and extending part way through the radial dimension. The unitary insert can have a substantial radial dimension when intended for load bearing under run-flat conditions, or can have a smaller, non-load bearing radial dimension when intended primarily to maintain bead-seating between the tire and rim under run-flat conditions, thereby facilitating the use of standard, one-piece drop center wheels with tires especially designed for "run-flat operation", and which provide their own load bearing support when running flat.

The present invention constitutes a further development and structural simplification of the safety roller, run-flat tire inserts disclosed in my U.S. Pat. No. 3,635,273 dated Jan. 18, 1972 and reissue thereof RE 28,196 dated Oct. 15, 1974, and in my U.S. Pat. No. 3,976,114 issued Aug. 24, 1976. These prior patents relate to tire inserts made up of a plurality of arcuate members which, as joined to form a complete ring, circumferentially engage the tire mounting rim in a manner to rotate therewith during normal operation and to slip circumferentially with respect thereto when riding on a deflated tire. As disclosed in said U.S. Pat. No. 3,976,114, one of the joints between said arcuate members can be provided with lock means automatically engageable as the arcuate member ends are moved toward each other as, for example, by applying radial external forces to an assemblage of insert, mounting rim, and mounted, but deflated, tire. This automatic lock feature enables the insert to be partially assembled within a tire and the resulting subassemblage to be mounted on the wheel or rim by the automatic tire mounting machinery conventional in automotive assembly lines, with the insert then being locked and clamped on the wheel or rim by applying opposed radial forces to the tire prior to inflation.

It has now been found in accordance with the present invention that advantageous features similar to those of my earlier load bearing, safety roller, run-flat inserts for inflatable tires can be achieved with substantial reduction is manufacturing and mounting costs, particularly for intermediate and compact cars, by fashioning the run-flat insert as a unitary split ring member having sufficient flexibility to permit circumferential spreading at the split to permit the inner, rim engaging, periphery of the insert to be passed over the inherently larger diameter rim flanges. It has been found that safety roller, run-flat inserts having this type of flexibility are just as compatible with automatic tire mounting machinery as are my earlier run-flat inserts made up of pivotally coupled arcuate members.

The desired flexibility to permit the circumferential expansion above mentioned can be achieved in various ways as for example by proper selection of materials, modifying the structure to enhance flexibility, or a combination of these factors. In some instances, for example, rubber compositions and moldable plastic compositions such as certain of the polyurethanes can be employed to provide run-flat inserts requiring no structural modification to enhance flexibility. Bead retention and non-load bearing inserts for especially designed "run-flat tires", which provide their own load bearing support when running flat, can advantageously be formed of such flexible materials.

In instances where safety roller load bearing must be provided, however, and particularly when the insert is intended to extend a substantial radial distance beyond the rim flanges, it is preferable to employ less yieldable and compressible material such for example, as U.H.M.W. (ultra high molecular weight) polyethelene. In order to provide the necessary circumferential flexure in inerts formed from such less resilient material, the structure of the insert can be modified by providing a plurality of slits extending part way through the insert from the inner periphery thereof. If such slits extend to preformed holes or apertures passing through the insert, the formed slit is prevented from extending further through the insert under the stresses of circumferential expansion.

While such radial slits can be provided at uniformly spaced intervals circumferentially of the inner periphery of the insert, it should be noted that a somewhat irregular spacing of such slits can be appropriate to accommodate the flexing movements required. This will be apparent when one visualizes an initial planar flexing of the insert at the split portion thereof to permit one of the split ends to be within the rim and the other outside the rim. As the outer portion is then flexed with a tire iron or the like, the insert will feed, spiral fashion, into the space between the rim flanges and it is found that in this spiral feeding, the greatest flexibility is needed through an arc of about 200°–240°, i.e. 100° to 120° to either side of a point diametrically opposed to the split portion of the insert.

To provide more structural strength for heavy cars, a thin circumferential core of flexible metal can be embedded in the insert at approximately the inner terminus of the radial slits as a means of offsetting the reduction in circumferential tensional strength due to the slits. Such embedding can be accomplished by molding plastic material of the insert around and/or through apertures in the circumferential core. Alternatively, one can employ a built-up or composite structure in which the circumferential core extends the full width of the insert, has a resilient band secured to its outer surface, and has contiguous sectors of the inner, rim engaging portion of the insert secured to the inner surface thereof by suitable fasteners or other bonding means.

The improved unitary run-flat inserts can be fashioned in various ways, but on a large production scale would be preferably molded as a unitary body. In such instance the mold could suitably be designed to produce the insert in a slightly expanded or "semi-expanded" configuration, i.e. with the ends at the split portion thereof separated by about two to four inches, depending upon the wheel size for which the insert is intended. The effect of this is to lessen the amount of circumferential expansion necessary for assembling the insert on a rim while at the same time not interfering with closing and locking together the split ends by applying appropriate radial or circumferential forces to the insert.

Radial slits above mentioned employed to enhance flexibility of inserts formed from polyethelene or the like do not appear to interfere in any way with the slipping between insert and rim when load bearing; although the radial, load bearing strength, particularly as heated in run-flat use, is somewhat less if the slits extend into reduced thickness portions of the insert, rather than into the full thickness portions thereof.

While the improved unitary run-flat insert is viewed as especially suited for adaptations intended to become load bearing prior to complete collapse of a tire, i.e. adaptations in which the insert extends a substantial radial distance beyond the rim flanges, it is also, with different cross-sectional configuration, well suited to the maintaining of bead-setting in especially designed run-flat tires which provide their own load bearing support when running flat. Such especially designed tires differ from the conventional tires in having much thicker, and sometimes lower, sidewalls which fold upon themselves to become load bearing when deflated. While this approach to run-flat operation has created considerable interest, it is safe and effective only so long as the tire beads remain properly seated against the rim flanges when driving on a deflated tire. By employing in my unitary insert a more resilient construction material, and providing a cross-sectional contour which is deformable by radial pressure, it is found that effective means is provided for supporting the tire bead against displacement at the load bearing portion, when driving on a deflated tire, while at the same time providing the annular space needed for practical assemblage of the insert and low profile tire to the standard, drop center, one-piece wheel.

Lock means for joining the split ends of the unitary insert can be of various types including, for example hook and ratchet means at the outer periphery of the insert, hook and ratchet means at opposed sides of the insert, and interengaging plug and socket means at the abutting surfaces of the split ends (and embedded in the body of the insert). Because the inherent flexibility of the insert fosters relative movement of the split ends, both radially and axially of the insert, under the stresses of run-flat operation it is important that there be aligned plug and socket means, or other positive interfitting means at the abutting split ends to prevent such relative movement. The interengaging plug and socket type lock can, of course, also provide the aligning means; but with the other type lock means above mentioned supplemental aligning means is needed, particularly near the outer periphery when turning, and other driving forces may tend to cause relative axial movement of the split ends.

With the various automatic lock means provision must be made for manual disengagement of the lock means when tire trouble necessitates removing the tire and insert. With one tire bead removed from the rim and flexed to one side the lock area can be exposed so that the peripheral hook lock can be disengaged by a screw driver or similar prying tool.

When the lock means comprises hook and ratchet means at opposed sides of the insert, and only one side can be made accessible; it is important to provide movable means extending axially of the assemblage, and controllable from the exposed side, for imparting a spreading action to the opposed hooks to disengage them from their associated ratchet means. Such spreading action can be provided, for example, by a bolt having threaded engagement with one hook member and bearing engagement with the other, which bearing force can be varied by rotating the bolt from the exposed side.

With the plug and socket type of lock there must be means within the socket portion for automatically engaging the plug portion as the split ends are flexed to an abutting position, but which can be moved from the accessible side of the assemblage so as to disengage the plug portion. A preferred lock mechanism of this type comprises a threaded stud protruding from one split end entering a socket in the other split end in which is movably dispersed a bayonet type spring plate lock carried by a holder which protrudes outwardly of the exposed side surface of said split end.

Replacement of run-flat inserts after tire repair and the like presents no problem, even if the mechanic does not have means available to squeeze the tire-insert assemblage to close the lock as sockets or axial apertures are provided at opposed sides of the lock joint into which rods can be inserted and, through a connecting loop, employed to exert the necessary locking pressure. This procedure is fully described in my prior U.S. Pat. No. 3,976,114.

Run-flat inserts in accordance with the present invention provide important safety features for the motorist. They prevent any loss of control in the case of sudden deflation, even in such extreme instances as blow-outs at 75 to 80 miles per hour. Equally important, however, is the ability to drive long distances at moderate speeds of 35 to 40 miles per hour making it unnecessary to stop or slow to a dangerously low speed on a busy highway due to tire deflation.

When driving on a deflated tire, some heat is generated by the insert slipping on the rim (the engagement between the outer periphery of the insert and the inside of the tire tread being primarily a rolling action), but even more heat is generated by the flexing of the tire sidewalls in the constantly changing road engaging and load bearing portion. Build-up of heat is therefore proportioned to the distance and speed of driving on a deflated tire. When an insert of the present invention is mounted on an unpainted rim drop center, sustained run-flat driving for 25 miles at 35 miles per hour does not produce an objectionable heat build-up. Thus if a driver holds to an average speed of about 35 miles per hour, with spurts that do not exceed about 50 miles per hour, and stops every 20 to 25 miles to let the tire cool, riding on the deflated tire could be continued for 100 to 200 miles, if necessary, to reach a location for tire repair or replacement.

If the tire has a slow leak, the motorist can drive flat to a service station, replace the air pressure, and drive normally for an extended period, since the run-flat driving does not ordinarily further damage the tire. Long distances have been driven with very little delay on "slow leak" tires, equipped with safety rollers, by simply repeating the reinflation cycle as needed.

The automotive industry has set a goal of 50 miles at 50 miles per hour for run-flat systems. This goal is considered to be unrealistic both in terms of the need, and in terms of the inherent heat generation problem due to side-wall flexing of conventional tires, and the inherent rubbing between superimposed layers of the thick walled, especially designed run-flat tires at the load bearing portion when deflated.

As for the need, it is difficult to imagine a highway situation in which the average motorist would be forced to drive for as far as 50 miles at 50 miles per hour before being able to either slow down or turn out of the line of traffic. Even for police, military, and other emergency vehicles it is difficult to visualize this goal as realistic.

In attempting to meet the heat generation problem, run-flat systems being proposed by the tire companies require liquid lubrication, either within the assemblage from the start or in containers which rupture in the event of a deflated tire. Such systems are dependent on a "limited damages" tire casing, which will retain the liquid. Some systems are advertised as capable of run-flat operation at 50 miles per hour for 50 miles, but this is based on a "sealed casing" after a tire deflation, and a resultant vapor pressure which unloads the high friction areas of a flat tire. A tread cut, or sidewall cut near the tread, which will permit the loss of liquid lubricant through centrifugal force when running flat; and the resultant friction heat is so severe that the tire could be set on fire at 50 miles per hour after loss of lubricant.

The safety roller inserts of my prior U.S. Pat. Nos. RE 28,196 and 3,976,114 and those of the present application are unique in providing what is believed to be the only run-flat system available as of this date which can be "run-flat dry" (without any liquid lubricant within the tire) for reasonable distances and speed without damage to the tire or the system. What makes this possible is the novel structure which permits the safety rollers to slip in the rim during run-flat driving to compensate for the circumferential difference between the tire tread and the outer periphery of the safety roller.

Extensive use of safety rollers on Bullet Security Limousines for the last five years has now become a world-wide acceptance and is presently the only system which will absorb ballistic damage and operate with dry bullet riddled tires. Several blowout demonstrations have been made to Government officials at 70 miles per hour, and a reknowned testing center conducted double blowout tests at 90 miles per hour. Good steering control was maintained with ample time to slow down, and no damage was imparted to the safety rollers. No lubrication was used on the blowout tests. However, all run-flat systems are heated limited and continuous speed should be limited to 35 to 40 miles per hour on a dry safety roller and for short distances. The Bullet Security Limousine is required to clear a dangerous area within 5 miles at 40 miles per hour with ballistic damaged tires. The dry safety rollers handle this specification with ease. With lighter cars, 20 to 25 miles as previously mentioned can be reached with dry safety rollers.

The safety roller can also meet the highest run-flat performance requirement of 50 miles at 50 miles per hour by using fixed lubricants (i.e. the non-leaking variety). A high viscosity lubricant which is heat resistant is applied to the inner perimeter of the safety roller before installation and a thick non-running type of lubricating gel is applied to the inside of the tire under the tread area. This type of lubrication, in combination with the unique, slipping on the rim, feature of the safety roller, provides high run-flat performance with any kind of tire failure including cuts in the tread area.

The average motorist will have no need for run-flat operation approaching 50 miles at 50 miles per hour. For such average motorist, therefore, it is preferable that the standard tire should be installed with a safety roller in the dry state, without either liquid or gel lubricant, to facilitate easier tire repair. If the motorist with tire trouble has traveled about 10 miles on a deflated tire, and realizes that considerable distance must still be traveled to reach a point of tire repair, he can pull to the side and introduce a quantity of lubricant through the tire air inlet from a pressure container carried in the vehicle. Such a container of lubricant would be supplied with safety rollers when installed in the dry state.

Novel features of the invention will be more fully understood from the following description having reference to the accompanying drawings in which preferred adaptations of the unitary run-flat insert are illustrated with the various parts identified by suitable reference characters, and in which.

Figures 1, 2, 3:
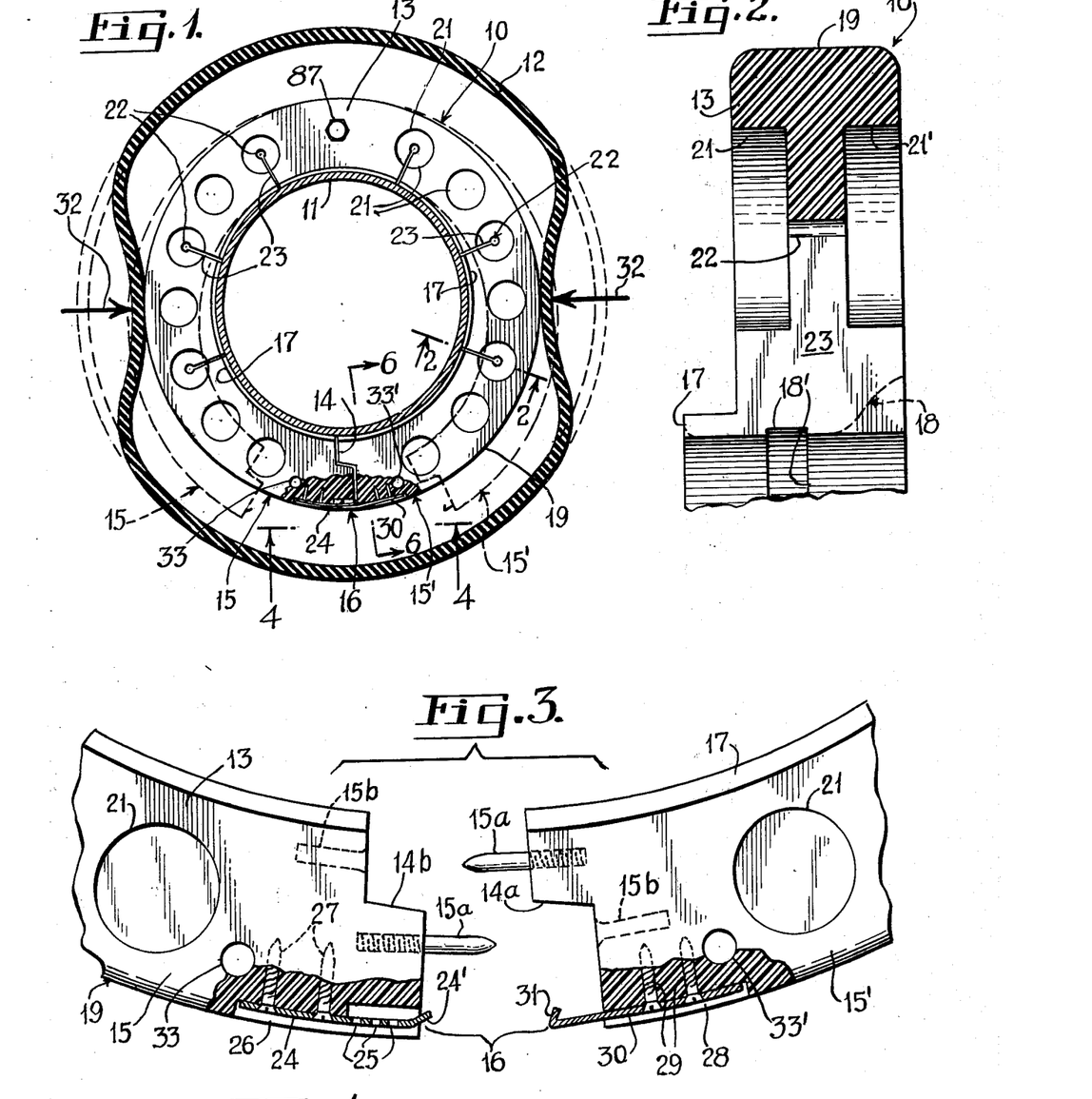
FIG. 1 is a sectional view through a tire, rim and run-flat insert assemblage showing in dotted lines the position of the insert before applying external pressure and in full lines the position of the insert when external pressure is applied to lock the same.
FIG. 2 is a sectional view through the insert substantially on the Line 2—2 of FIG. 1.
FIG. 3 is a fragmentary, enlarged view of the automatic lock portion of the insert as shown in FIG. 1 in the separated or unlocked position.

As indicated in FIG. 1 of the drawing, a run-flat insert or safety roller 10 has been shown within the assemblage of a wheel or rim 11 and inflatable tire 12. The insert or roller 10 comprises a unitary circular member 13 which is split at one circumferential portion as seen at 14 to provide relatively movable ends 15, 15', which are secured together by lock means 16.

The inner periphery of the circular member 13 is provided at one side thereof with a lateral flange 17 to aid in positioning the insert in the drop center of the wheel rim 11, while also providing the clearance needed when mounting the second tire bead on the rim 11. As indicated at the dotted line 18 in FIG. 2, the inner periphery may be further machined or contoured to closely fit the profile of a particular drop center.

It is intended that the lock means 16 will support the inner periphery of the insert 10 in sufficiently close circumferential engagement with the rim 11 so that the insert 10 will rotate with the rim in normal driving but will slip and rotate with respect to the rim when driving on a deflated tire. In this connection it will be noted that the outer periphery 19 of the insert 10 extends a substantial portion of the distance between the rim 11 and the inside of the inflated tire 12 so that engagement between the insert 10 and tire 12 when riding on a deflated tire prevents a full collapse of the tire in the load bearing zone. To compensate for the different circumferences at the tread and outer periphery of the insert when riding on a deflated tire, the insert 10 rolls along the inside of the tire tread at the load bearing zone while slidably rotating with respect to the rim. Such sliding can be facilitated by appropriate selection of the production material for that portion of the insert which bears against the rim 11; and polyethelene, particularly U.H.M.W. polyethelene, has been found to provide the desired slipping at the insert-rim interface.

Such slipping can also be facilitated by including within the assemblage a suitable lubricant as earlier discussed herein. A high viscosity, heat resistant lubricant may be applied to the inner periphery of the insert, in which event an annular lubricant groove 18' may be provided, suitably about 1/32 inch deep and 3/16 inch wide, in said inner periphery for enhanced retention of lubricant. This use of viscous or "fixed" lubricant which reduces the rim heat during run-flat driving is increasingly beneficial as insert size and intended vehicle weight are increased.

Figure 5:
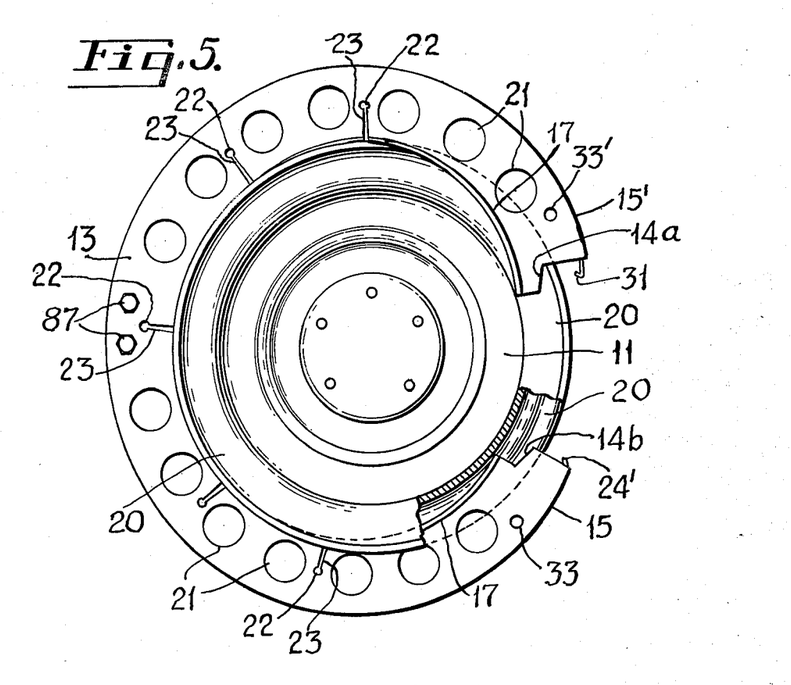
FIG. 5 is a plan view of a wheel showing a flexible run-flat insert partially assembled thereto.

The circular member 13 of the insert 10 must have sufficient planar and circumferential flexibility to permit a wide displacement and separation of the end portions 15, 15' as the insert is passed over one of the rim flanges 20 as shown in FIG. 5 of the drawing to permit positioning of the insert between the flanges 20. This degree of flexibility can sometimes be provided by appropriate selection of construction material for the insert 10, but it will be apparent that increase in flexibility will also increase the radial compressibility when the insert becomes load bearing; and where load bearing strength dictates the selection of construction material, it may be necessary to modify the structure of the circular member 13 to enhance the planar and circumferential flexibility.

As shown in FIGS. 1 and 2 of the drawing, a circular member 13 formed of U.H.M.W. polyethelene which is quite rigid is provided with a plurality of depressions or recesses 21, 21' on opposed side surfaces and circumferentially spaced about the member 13 in a manner to minimize weight while preserving the desired radial compressive strength. At a number of the aligned depressions 21, 21' central bores 22 are provided which extend in a direction perpendicular to the plane of the insert 10, and slits 23 are formed extending radially from the bores 22 to the inner periphery of the circular member 13. At each of the slits 23 it will be apparent from a consideration of FIG. 2 that the cross-section of the circular member 13 is substantially reduced in a manner to enhance both planar and circumferential flexing of the circular member 13.

In FIG. 5 of the drawing the insert 13 is generally similar to that shown in FIG. 1 except that bores 22 and slits 23 communicating therewith have been located between pairs of depressions 21, 21' rather than extending into the depressions, as shown and described in FIGS. 1 and 2. While the orientation of slits shown in FIGS. 1 and 2 provides somewhat greater planar and circumferential flexibility, the orientation shown in FIG. 5 provides somewhat better compressive strength, and is therefore preferred in inserts intended for use with heavier vehicles.

There is a distinct widening of the slits 23 as the member 13 is circumferentially expanded as clearly shown in FIG. 5 of the drawing, as well as slight axial displacement of inner peripheral portions of the member 13 at opposed sides of each slit 23. It should be noted, however, that such axial displacement, which facilitates assemblage of the insert 10 on a rim 11, presents no problem after assemblage due to the close conforming engagement with the rim drop center as earlier mentioned and the aligning effect of such engagement.

As shown in FIGS. 1 and 5 of the drawing, the positioning of the slits 23 has been more concentrated in that portion of the circular member 13 which is remote from the split 14. It has been found that the concentration of slits 23 in an arc of 200° to 240°, i.e. 100° to 120° to either side of a point diametrically opposite the split portion 14 of the insert, provides enhanced flexibility in the locations which are most helpful in facilitating the mounting of the insert 10 between the flanges of the rim 11. It will be noted, moreover, that the optimum number and location of slits 23 will vary with different wheel sizes, and/or the flexibility of the construction material of the safety rollers 10.

Figure 4:
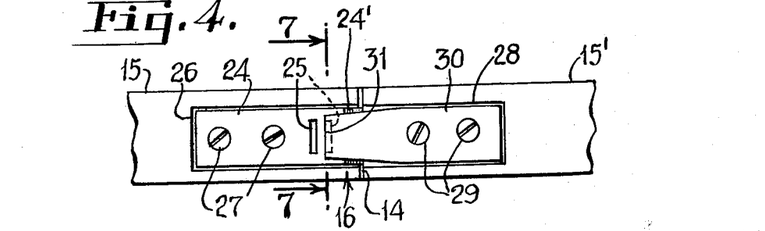
FIG. 4 is a fragmentary view of the lock portion of the insert as viewed in the direction of the arrows 4—4 in FIG. 1.

As shown in FIGS. 3 and 4 the lock means 16 comprises a spring plate 24 having a deflecting end 24', and a plurality of notches 25 secured in a recess 26 in one of the end portions 15 by means of suitable fasteners 27. The other end portion 15' carriers in a recess 28 and supported by suitable fasteners 29 a spring plate 30 having a projecting hook end 31 adapted to engage one of the notches 25 in a spring plate 24. It should be noted that the irregularly contoured split 14 provides a shoulder 14a on end portion 15' which coacts with an undercut 14b on end portion 15 to provide radial alignment of the end portions as joined by the lock means 16 and will prevent unintended disengagement of the hook 31 with respect to the apertured plate 24. The shoulder 14a and undercut 14b are preferably slightly tapered as indicated to facilitate unobstructed mating of the ends 15, 15' as they are forced together to engage the lock means 16 by the application of external opposed forces as indicated by the arrows 32 in FIG. 1. To maintain coplanar alignment of the engaged ends 15, 15' a stud 15a is embedded in at least one of said ends, and preferably in both as shown, to mate with a socket 15b in the opposed end.

In this connection it will be understood that when a tire 12 having an unlocked insert 10 within it as a subassemblage is then mounted to a wheel or rim 11 by automatic tire mounting equipment, the insert within such assemblage will assume substantially the dotted line position shown in FIG. 1. By applying opposed forces in the direction of the arrows 32 prior to inflation of the tire, the insert 10 is moved to the close rim engaging position shown in full lines in FIG. 1 with the lock means 16 automatically engaged to hold the insert in this position.

When the insert 10 is being manually mounted, the procedure is to first place the open insert 10 within the tire 12, pass one tire bead onto the rim, feed the insert over the rim flange into the drop-center, then by means of rods inserted in apertures 33, 33' provided in the end portions 15, 15' force the end portions 15, 15' toward each other to engage the lock means 16, and finally pass the second tire bead onto the rim 11 and inflating the tire.

When it is necessary to disengage the lock means 16, it is simply necessary to insert a screwdriver or other prying instrument between spring plate 24 and the hook end 31 of the spring plate 30, with the resilience in the circular member 13 separating the ends 15, 15' as soon as the hook end 31 has been lifted from the associated slot 25. It should be noted, however, that gaining accesss to the area for such disengagement is greatly facilitated by inserting a rod or rods in one or both of the apertures 33, 33' to pry aside the tire bead and make the lock area accessible.

Figure 6:
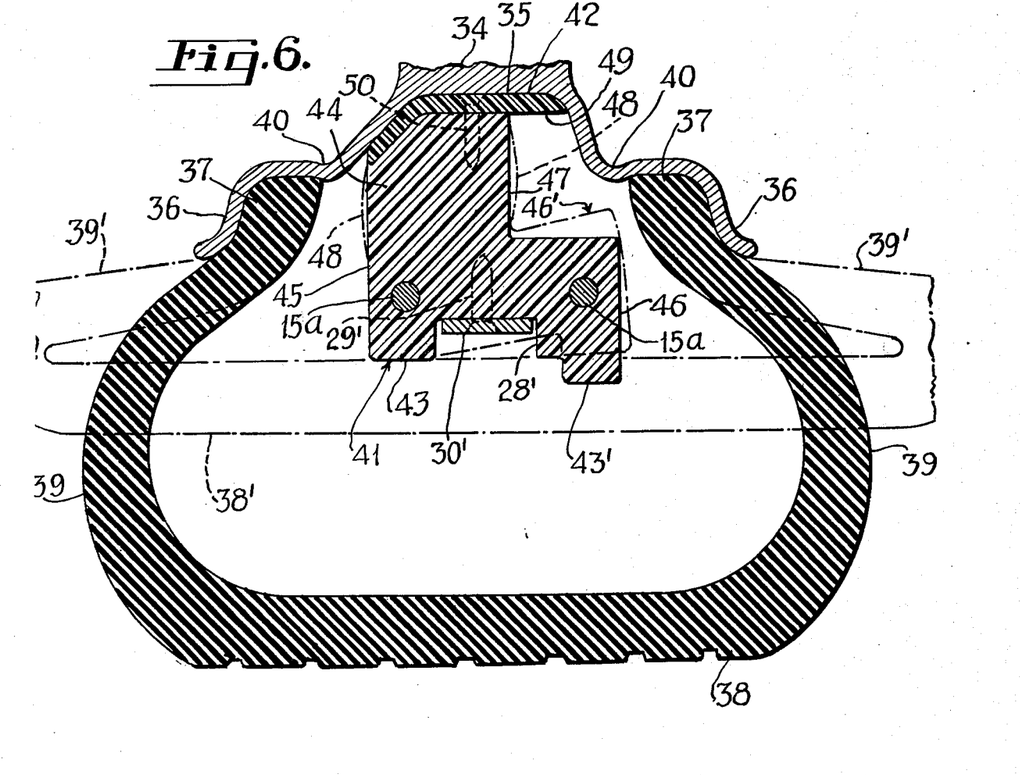
FIG. 6 is a sectional view through a tire, rim and run-flat insert assemblage showing a modified form of insert for provising bead-seating function.

FIG. 6 shows in cross-section a portion of a wheel rim 34 having a central drop center 35 and side flanges 36 contoured to receive the beads 37 of a low profile tire 38 having thick side-walls 39 specially intended for run-flat operation. The slight ridges 40 in the rim inwardly of the flanges 36 and known in the industry as "rim humps", are intended to aid in bead-retaining when getting stopped with a deflated tire, in which event the road contacting load-bearing portion assumes the approximate contour, shown in dotted lines, of the tire 38' and collapsed side walls 39'. Even with the rim humps 40, however, both of the beads 37 can be forced into the drop center due to circumferential differences with resulting impairment of driving control and safety.

The special designed, thick walled run-flat tire approach to run-flat operation can not be used on a standard, one-piece, drop center wheel without bead retention means. A flexible ring insert 41 generally similar to the insert 10 previously described having an inner periphery 42 closely conforming to the contour of the drop center 35 will provide bead retention on such standard wheel. In this instance, however, the insert 41 has a much smaller radial dimension, with the outer periphery 43 extending only a short distance radially beyond the flanges 36.

The insert 41 comprises a unitary circular member 44 split at one circumferential point to provide movable and interfitting ends secured together by automatic lock means as described in connection with FIGS. 1 to 5. If FIG. 6 is visualized as being circumferentially located at the line 6—6 of FIG. 1, then 30' represents the hook part of the lock mechanism secured in a depression 28' by suitable fasteners 29', and 15a represents aligning studs for the split ends as earlier described.

The circular member 44 has a width greater than that of the drop center 35 and almost as great as the spacing of the seated beads 37, with one solid side 45 effectively preventing the unseating of the adjacent bead 37. The opposed side 46 has an annular recess 47 providing space into which part of the adjacent bead 37 can slide during the operations of mounting and dismounting the tire 38 with respect to the rim 34.

The circular member 44 is formed of hard rubber or semiflexible plastic material and is provided at its outer periphery 43 with an annular projection 43' adjacent the side 46 and in radial alignment with part of the recess 47. Now when driving on a deflated tire the road-contacting, flattened portion of the tire, as it bears against the annular projection 43' causes a deflection of side 46 toward the rim 34 so that its inner corner 46' will bear against and prevent unseating of the adjacent bead 37 as clearly indicated in the dotted line showing in FIG. 6. Depending upon the run-flat load on the assemblage there can also be some overall compression in the inner portion of the circular member 44 as indicated by the dotted bulges 48; and it will be apparent that the effect of any such compression is to move the corner 46' closer to the rim 34 enhancing its bead-seating action.

It will be apparent from the foregoing that during run-flat operation the major portion of circular member 44 will have the cross-sectional configuration shown in full lines, and only that portion in the zone of the road-contacting portion of the tire will assume the dotted, bead-seating configuration. This, however, is the critical zone in which distortion in the flattened tire tends to unseat the tire beads.

It is important that the insert 41 roll on the inside of the flattened tire tread 38' and slip and rotate on the rim 34. If the construction material of the circular members 44 does not permit such slippage, a thin annular layer 49 of polyethylene, or other material providing the desired slippage, and contoured to fit the drop center 35 can be applied to the inner periphery of the circular member 44 by suitable fasteners 50 or other bonding means.

As the circular member 44 is formed of semi-flexible material, the planar and circumferential flexing needed to pass the insert 41 over the rim flanges 36 in mounting and demounting the insert presents no problem, and it is unnecessary in this modification to enhance the flexing as by the spaced radial slits 23 shown in FIGS. 1, 2, and 5. It will be understood, however, that in any adaptation of the invention the inherent flexibility of the construction material can be enhanced if necessary by radial slits 23, or the like, to permit the necessary amount of planar and circumferential distortion in mounting and demounting of the run-flat insert.

The adaptations of the invention shown in FIGS. 1 to 5 and FIG. 6 both have automatic lock means disposed at the outer periphery of the run-flat insert. During run-flat operation forces generated by road irregularities, negotiating curves, etc., can induce lateral movement of the split ends 15, 15' with respect to each other tending to disengage the lock by the hook end 31 camming outwardly through bearing against an end of the engaged notch 25. While the stud or studs 15a greatly restrict the extent of such lateral movement between the ends 15, 15' it is desirable that the chance of accidental disengagement be further minimized by specially contouring the hook end 31.

Figures 7, 8, 9, 12, 13, 13A:
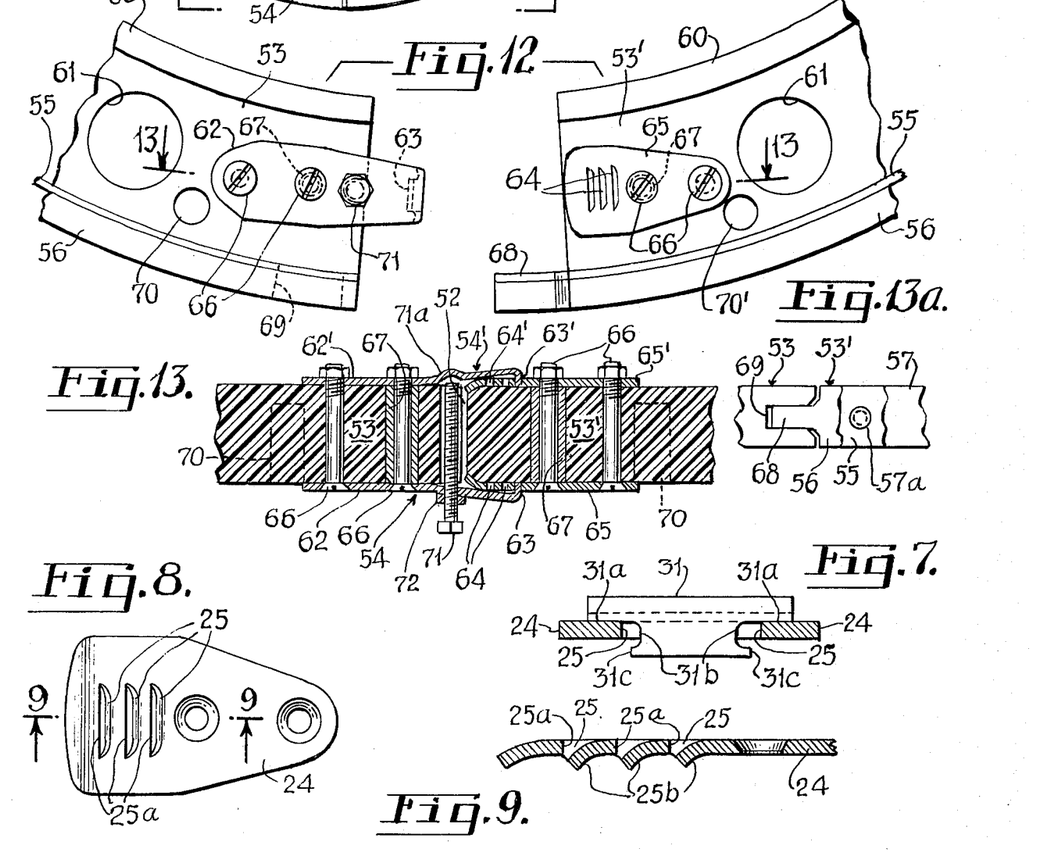
FIG. 7 is a sectional view of the engaged lock members taken substantially on the line 7—7 in FIG. 4.
FIG. 8 is a plan view of an apertured lock member similar to that shown in FIGS. 3 and 4 but indicating a somewhat modified form of construction.
FIG. 9 is an enlarged sectional view substantially on the line 9—9 of FIG. 8.
FIG. 12 is a fragmentary, enlarged view of the automatic lock portion of the insert as shown in FIG. 10 in the separated or unlocked position.
FIG. 13 is a sectional view substantially on the line 13—13 of FIG. 12 with the parts in the locked position.
FIG. 13a is a fragmentary view looking in the direction of the arrows 13a—13a of FIG. 10.

As shown in FIG. 7 the hook end 31 can be contoured at its sides to provide coplanar portions 31a for engagement with the outer surface of plate 24, joining curved portions 31b extending through notch 25, and terminating in divergent end portions 31c spaced to freely pass through notch 25, and to be disposed below the lower surface of plate 24 when the upper surface is engaged by coplanar portions 31a. It will be seen that with this construction lateral movement of the split ends 15, 15' will cause one or the other of the divergent end portions 31c to hook under the plate 24, thereby preventing accidental disengagement of the hook end 31 from the notch 25. The divergent end portions 31c do not, however, in any way restrict lifting of hook end 31 against the tension of spring plate 30 when it is desired to disengage the lock, as when preparing to remove the run-flat insert from the wheel or rim.

It will be apparent that the arrangement and spacing of the notches 25 in spring plate 24 are important to the effectiveness of the lock means in clamping the run-flat insert closely to the wheel drop-center. While simple cut out notches as shown in FIGS. 3 and 4 can be employed, it is preferable to form the notches by a shearing and deforming of the plate 24 as illustrated in FIGS. 8 and 9 prior to heat treatment to develop the desired spring temper. Cuts are made at 25a with a suitable shearing punch which deforms downwardly the adjacent metal as seen at 25b. This, at the same time, forms the notch openings 25, and provides rounded cam surfaces facilitating advance of the hook end 31 of spring plate 30 for engagement with the proper notch 25. Because the metal is being deformed, rather than cut away in thus forming the notches 25, this manner of forming permits a very close spacing of the notches 25 while maintaining needed strength in the plate 24.

The peripherially located lock means has the advantage of simplicity, light weight in automatic locking, and ease of disengagement when change is required. However, it is not fail safe in that it does not have a duplicate back up connection for redundancy. Two alternative types of lock mechanism will therefore be briefly discussed.

In FIGS. 10 to 13 of the drawing I have shown a slightly modified form of run-flat insert having dual automatic lock means disposed at opposed sides of the split ends of the insert. In this modification the run-flat insert 51 is a unitary circular member of composite structure which is split at one circumferential portion 52 to provide relatively movable and abutting ends 53, 53' which are secured together by lock means 54, 54' disposed respectively at the access side and remote side of the insert.

Figures 10, 11:
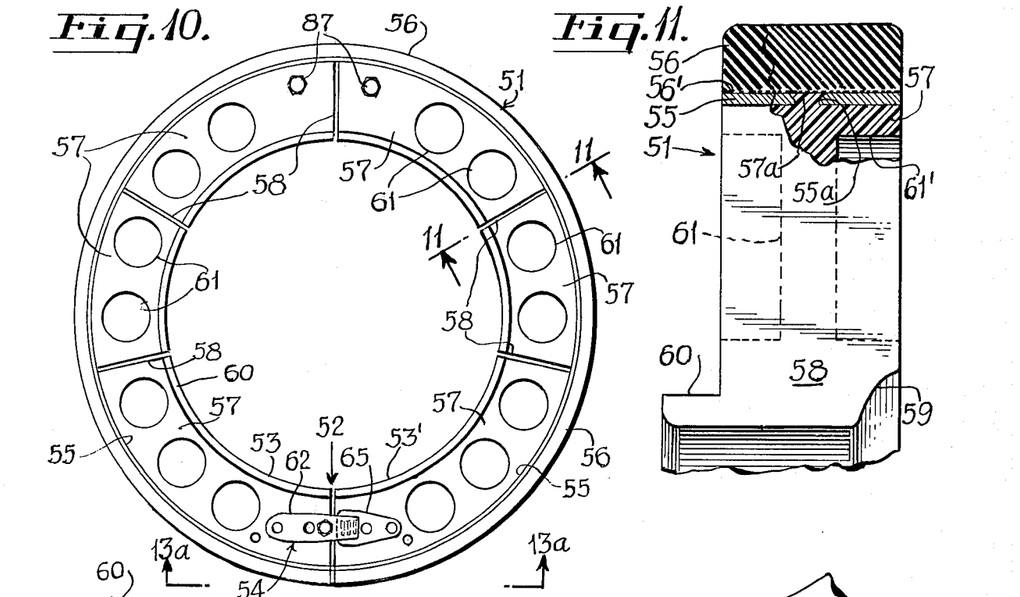
FIG. 10 is a plan view of a run-flat insert similar to that shown in FIG. 1 but with modifications in the insert structure and the orientation of lock means.
FIG. 11 is a sectional view substantially on the line 11—11 of FIG. 10.

The composite structure of the insert 51 comprises an annular core or band 55 of spring metal such as steel or aluminum alloy having secured to the outer surface thereof a band 56 of rubber or semi-flexible plastic forming the outer periphery of the insert, and at the inner side thereof a plurality of arcuate sectors 57 of relatively nondeformable plastic separated by slits 58, and collectively forming the inner periphery of the insert. The inner periphery is shaped to fit the wheel drop center for which it is intended by providing appropriate contour as at 59 and lateral flange 60 at the access side of the insert.

The outer band 56 is preferably bonded to the metal core 55 as indicated at 56' by techniques conventional in the bonding of solid rubber tires to wheels; and it will be apparent that the subassemblage of band 56 and core 55 is inherently capable of circumferential and axial flexing when forces are applied to the split ends 53, 53'.

The arcuate sectors 57 can be similarly bonded to the core 55. As a preferred method of production, the arcuate sectors 57 will be injection molded to the mold supported subassemblage 55, 56, in which event a plurality of flared apertures 55a at appropriately spaced intervals around the core 55 receives a flow of material forming the sectors 57 to provide integral studs 57a. While thus bonding the sectors 57 to the core 55 produces rigidity within the sectors, there is sufficient flexibility at the points in alignment with the slits 58 to permit the relative circumferential and axial movements of the ends 53, 53' to permit passing the insert over the wheel rim and compressing it for close engagement with the wheel drop-center.

The sectors 57 have a plurality of opposed depressions or recesses 61, 61' spaced circumferentially of the insert and with respect to the slits 58 to minimize weight of the insert, while maintaining the needed radial compressive strength for load bearing in run-flat operation. While the number and arrangement of slits 58 and depressions 61, 61' as shown in the drawing is appropriate for inserts intended for use on vehicles of moderate weight, such as compact and intermediate size automobiles, it is to be understood that the size and spacing of depressions 61, 61', and the location and number of the slits 58 can be varied in inserts of different size and intended for different weight vehicles.

The lock means 54, 54' comprise generally similar opposed spring plates 62, 62' on split end 53 carrying hook ends 63, 63' which engage slots 64, 64' in spring plates 65, 65' on split end 53'. The spring plates 62, 62' and 65, 65' are mounted by means of bolts or other suitable fasteners 66, and at least the fasteners 66 closest to the split 52 preferably pass through bushings 67 to provide a stronger anchorage in the polyethylene body of the insert, i.e. an anchorage more resistant to shifting as the parts become heated in run-flat use.

To maintain planar and radial alignment of the split ends 53, 53' the core 55 and band 56 are provided with interfitting means as shown in FIG. 13a by the protruding tongue portion 68 on split end 53' and co-acting groove 69 on split end 53. It will be seen that the interfitting tongue 68 and groove 69 provide substantial continuity of the band 56 in the area of split 52 when the insert is locked on a wheel.

The sockets 70, 70' as shown in FIGS. 12 and 13 provide the same function as the through holes 33, 33' shown in FIG. 3, assisting both in manual closing of the lock joint, and in prying aside the tire bead to provide access for disconnecting the joint.

When disconnecting of the lock joint is necessary, only one lock means 54 will be accessible, but both 54 and 54' must be disconnected at the same time. While a special tool could be inserted at the slit 52 to apply spreading force to the spring plates 62, 62', it is preferable to have spreading means readily available. For this purpose spring plate 62, at the access side, has been shown as carrying a bolt 71 having threaded engagement with a nut or bushing 72 secured to the spring plate 62, and aligned with a socket or detent 71a in spring plate 62'. The bolt 71 normally does not contact spring plate 62'; but when advancing bolt 71 it will establish contact with the socket 71a of plate 62' and apply equal spreading force to spring plates 62, 62' to lift the hook ends 63, 63' out of engagement with the slots 64, 64', thereby permitting split ends 53, 53' to move apart.

While the slots 64, 64' have been shown as simple apertures in plates 65, 65', it is desirable that the slots and the hook ends 63, 63' be fashioned in the manner shown in FIGS. 7 to 9.

Figure 14:
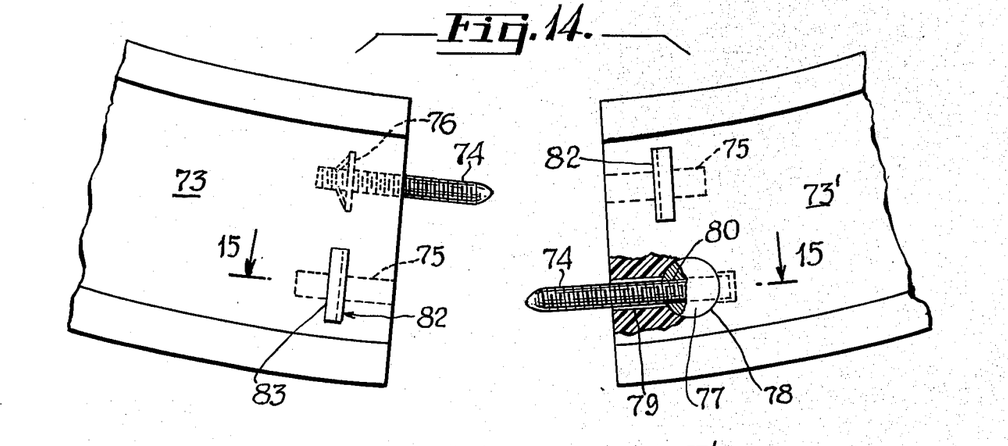
FIG. 14 is a fragmentary view similar to FIG. 12 but showing a modified form of lock mechanism.
Figures 15, 16, 17:
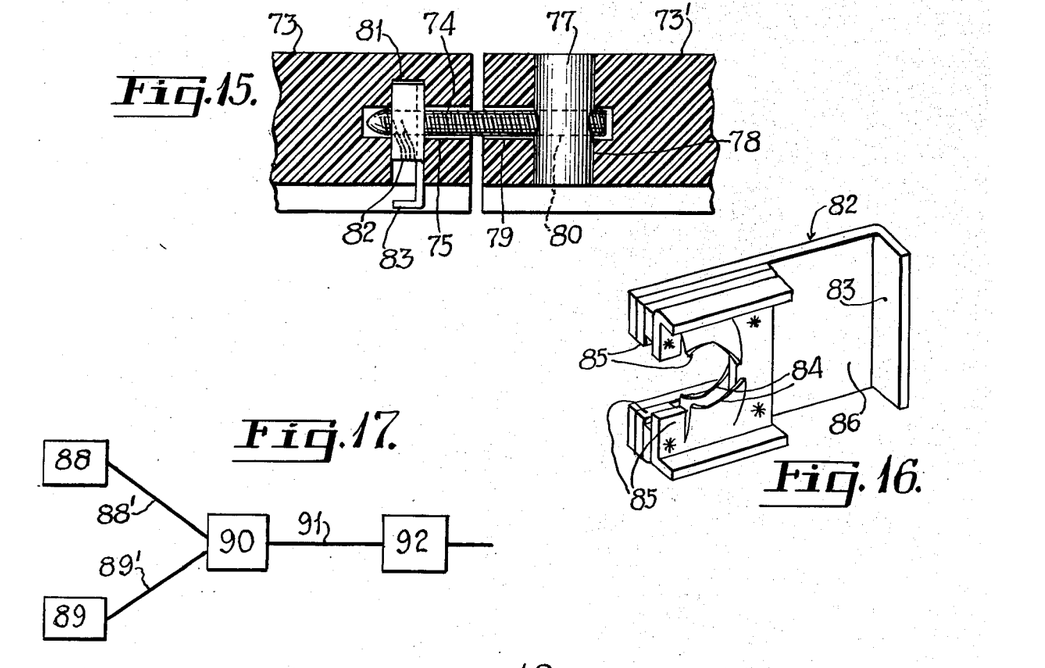
FIG. 15 is a sectional view substantially on the line 15—15 of FIG. 14 with the parts in the locked position.
FIG. 16 is an enlarged detail view of a movable element of the lock structure shown in FIGS. 14 and 15.
FIG. 17 is a schematic diagram of a conventional automatic tire mounting assembly line.

Another type of lock means which is both simple and reliable has been shown in FIGS. 14 to 16 in connection with fragmentary split ends 73, 73' of a run-flat insert. Each of the split ends carries a threaded stud 74 embedded approximately midway between opposed planar surfaces of said split ends and registering with cylindrical recess 75 in the opposed split end. The studs are anchored by laterally extending means such as an engaged nut or suitably an engaged plate nut as shown at 76 in split end 73. Such embedded anchorage is best suited for use when the insert is fashioned from moldable material. When using a material such as U.H.M.W. polyethylene an appropriate anchorage can be provided by a transverse member 77 as shown on split end 74' which is of larger diameter than the stud 74 and fits snugly in an aperture 78 at right angles to a recess 79 receiving stud 74; the member 77 being tapped as indicated at 80 to provide threaded engagement with the stud 74.

For locking engagement with the studs 74 a recess 81 is provided perpendicular to each recess 75 to receive a bayonet-type plate nut assemblage 82 having a protruding hook part 83 to facilitate insertion and removal. The assemblage 82 as more clearly shown in FIG. 16 comprises at least one, and preferably two, aligned plate nuts 84 having side cut outs 85 securely bonded to a supporting frame 86 which carries the hook part 83. With the assemblage 82 in position within the recess 81 the threaded stud 74 entering recess 75 can freely pass through the plate nut(s) 84 to become locked at the point of maximum advance.

The locking engagement thus provided is a very positive one, as any force tending to separate the parts intensifies the clamping engagement of the plates nut(s) with the threaded stud 74. On the other hand, when there is need to disconnet the lock joint, this can be easily accomplished by withdrawing assemblage 82 from recess 81 thereby freeing stud 74.

In the adaptations of the invention as herein described it will be apparent that the automatic lock devices add several ounces of weight at one location circumferentially of the run-flat insert. In order to provide dynamic balance it is important that a corresponding weight be added at a point diametrically opposed to the lock mechanism. Such counterbalancing weight has been diagramatically indicated at 87 in FIGS. 1, 5 and 10, and may comprise one or more bolts of appropriate weight secured to the run-flat insert.

A particular advantage of the unitary, flexible run-flat insert is that it can be installed automatically with slight modification of conventional automotive assembly line equipment producing tire and wheel sub-assemblages. FIG. 17 schematically illustrates a conventional assembly line comprising tire storage station 88 and wheel storage station 89 with conveyor lines 88' 89' respectively leading to tire mounting station 90 in which the tire beads are passed over the wheel or rim flanges, and thence via conveyor 91 to inflation station 92 where air pressure bead seating is effected and the assemblage then sealed with the desired air pressure.

Figure 18:
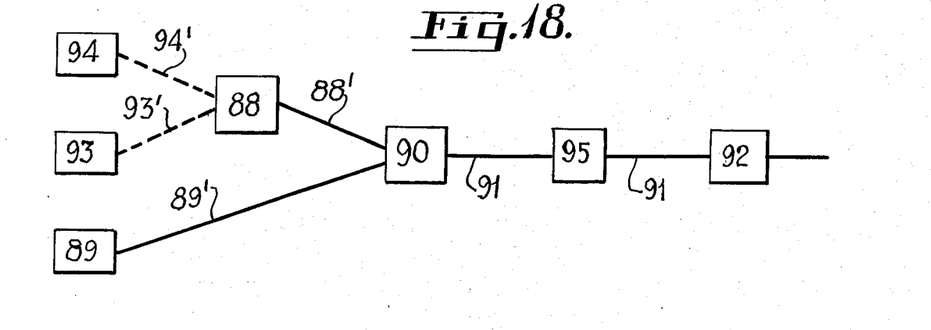
FIG. 18 is a schematic diagram similar to that of FIG. 17 but showing modifications therein to accommodate automatic mounting of the run-flat inserts of the present invention in the tire and wheel assemblage.

FIG. 18 schematically illustrates the slight modifications in an assembly line for installing unitary run-flat inserts within the wheel-tire assemblage. The station 88 will now be a storage station for tires already containing open or unlocked inserts within them, the possibility being that this tire-insert sub-assemblage may be supplied by the tire manufacturers. If tire and insert are separate the making of the sub-assemblage can be integrated with the assembly line by providing tire storage station 93 and insert storage station 94 connected by conveyors 93', 94' to station 88, which now automatically spirally feeds the insert into the tire.

At station 90 the tire-insert sub-assemblage is automatically mounted on the wheel in the same manner, and by the same equipment used, as when mounting tire alone. The resulting assemblage of wheel and loosely mounted tire and insert passes to pressure station 95 in conveyor line 91 where radial pressure is applied to the tire at two or more opposed locations to collapse the tire against the insert and compress the insert into close engagement with the drop center of the wheel thereby engaging coacting elements of the automatic lock. The sub-assemblage with the insert now fully mounted on the wheel continues on to station 92 for bead seating and inflation in the usual manner.

The ease with which mounting of the run-flat inserts of the present invention can be integrated into conventional automatic tire mounting procedures, coupled with the economies and reliability of the unitary run-flat insert, would seem to make the run-flat insert of the present invention especially suited for use as original automative equipment, thus making possible the elimination of a spare tire, or tire and wheel as an item of "standard equipment". A vehicle equipped with the run-flat inserts on all wheels should have no need for a spare tire, as the safe run-flat operation provided will permit driving to a service area for tire replacement or repair when tire trouble is encountered.

Various changes and modifications in the unitary flexible run-flat tire inserts and method of automatically mounting the same as herein described may occur to those skilled in the art, and to the extent that such changes and modifications are embraced by the appended claims, it is to be understood that they constitute part of the present invention.

I claim:

1. A run-flat insert for inflatable tires of the tubeless type wherein beads at the inner periphery of the tire are adapted to sealably engage side flanges of a mounting rim, said insert comprising a single joint, unitary ring member, split at one circumferential point to provide normally spaced end portions capable of relative planar and circumferential movement, said end portions having interfitting contours adapted to assure mating and alignment thereof, lock means on said end portions automatically engageable by movement of said end portions toward each other to thereby secure together said end portions to form a closed ring having an outer periphery protruding beyond said rim flanges and an inner periphery having firm and substantially continuous engagement circumferentially of said rim between said flanges in a manner to be rotatable on the rim when load-bearing, said split ring member having a continuous outer periphery of solid cross section and means providing expansive capability at the inner periphery thereof, said expansive capability being such as to provide sufficient planar flexibility to permit the forced spiral feed of said ring member into a tire, and sufficient circumferential flexibility to permit forced spreading of said end portions in passage of said ring member over a rim flange, and to finally permit radial compression to engage said lock means, said automatic lock means being the only circumferential joining of said end portions and consisting of resiliently engaged lock parts requiring resilient manual disengagement when removal of the insert from the mounting rim is desired, said lock means being so positioned and structured as to enable said resilient manual disengagement to be effected by access to only one side of said insert, and the means providing expansive capability at the inner periphery of said split ring comprising, at least in part, the employment of suitably deformable construction material.

2. A run-flat insert for inflatable tires as defined in claim 1, wherein the expansive capbility at the inner periphery of said split ring member is provided solely by the selection of a suitably deformable construction material.

3. A run-flat insert for inflatable tires as defined in claim 1, wherein the expansive capability at the inner periphery of said split ring member is provided in part by selection of a suitably deformable construction material and in part by modifying the ring structure to include a plurality of circumferentially spaced radial cuts extending part way through said ring member from the inner periphery thereof, said cuts being located within an arc of not more than about 240°, the mid point of which is diametrically opposed to the split of said ring.

4. The run-flat insert for inflatable tires as defined in claim 3, wherein said radial cuts terminate in holes or apertures extending through said ring member in a direction parallel to the axis thereof.

5. A run-flat insert for inflatable tires as defined in claim 3, wherein said radial cuts terminate in holes or apertures extending through said ring member in a direction parallel to the axis thereof, and said holes or apertures being approximately midway between the inner and outer peripheries of said ring member.

6. A run-flat insert for inflatable tires as defined in claim 3, wherein said insert has a plurality of circumferentially spaced, reduced thickness zones for minimizing weight in the insert, and said radial cuts are located to enter selected reduced thickness zones.

7. A run-flat insert for inflatable tires as defined in claim 3, wherein said insert has a plurality of circumferentially spaced, reduced thickness zones for minimizing weight in the insert, and said radial cuts are located between selected reduced thickness zones.

8. A run-flat insert for inflatable tires as defined in claim 3, wherein said split ring member includes a circumferential spring metal core intermediate the inner and outer peripheries of said insert, and said radial cuts extend from the inner periphery to said core.

9. A run-flat insert for inflatable tires as defined in claim 8, wherein apertured means spaced circumferentially of said core facilitate anchorage of said core in deformable construction material of said insert.

10. A run-flat insert for inflatable tires as defined in claim 9, wherein the portion of said insert outwardly of said core is formed of rubber or semi-flexible plastic bonded to said core, and the portion of said insert inwardly of said core is formed of deformable plastic which is bonded to said core through interengagement with said apertured means.

11. A run-flat insert for inflatable tires as defined in claim 1, wherein said interfitting contours include at least one stud protruding from one split end and mating with a recess in the opposed split end.

12. A run-flat insert for inflatable tires as defined in claim 1, wherein said interfitting contours include, adjacent the outer periphery of said insert, a transversely reduced tongue portion on one split end registering with a transversely disposed recess in the other split end.

13. A run-flat insert for inflatable tires as defined in claim 1, wherein said lock means comprises a detent carrying latch member extending circumferentially of one end portion, a projection carrying latch member extending circumferentially of the other end portion, at least one of said latch members having spring properties facilitating radial displacement for engagement and disengagement of said projection and detent means, said latch members being embedded in a depression in the outer periphery of said ring member, said depression being of sufficient depth to prevent protrusion of said latch members radially beyond the outer periphery of said ring member, while being accessible from said one side of the insert.

14. A run-flat insert for inflatable tires as defined in claim 13, wherein said detent carrying latch member has a plurality of detents extending transversely thereof, the other of said latch members has offset hook means for engagement with one of said detents, and said detents and hook means have coacting structure preventing inadvertent disengagement of said hook means in relative transverse movement of said latch members.

15. A run-flat insert for inflatable tires as defined in claim 14, wherein said co-acting structure includes a restricted center portion on said hook means, and a wider end portion, said wider end portion freely passing through said detents and in the engaged position being located below the under surface of said detent carrying member, whereby relative transverse movement of said latch members provides an interlock between said hook means and the engaged detent.

16. A run-flat insert for inflatable tires as defined in claim 1, wherein said lock means comprises a pair of lock mechanisms disposed on opposed surfaces, and parallel to the plane of, said insert, each of said lock mechanisms comprising a detent carrying latch member secured to one of said split ends and a hook carrying latch member secured to the other of said split ends, and at least said hook carrying latch member having spring properties facilitating displacement axially of said insert for engagement and disengagement of said hook and detent means, and means carried by said hook carrying latch member at said one side of the insert and adjustably engaging the opposed hook carrying latch member facilitating simultaneous spreading of said latch members to disengage the hook portions thereof from the co-acting detent carrying latch members.

17. A run-flat insert for inflatable tires as defined in claim 16, wherein the detents in said detent carrying latch members are closely spaced by a shearing action which downwardly deforms metal at one side of a shear cut to provide a hook receiving aperture between the deformed metal and the undeformed metal at said shear cut.

18. A run-flat insert for inflatable tires as defined in claim 16, wherein said means facilitating spreading of the latch members comprises a bolt having threaded engagement with the first of said latch members and extending transversely of the insert to engage aligning means on the other latch member, whereby advancing of said bolt from said one side of the insert applies equal spreading force to both of said latch members.

19. A run-flat insert for inflatable tires as defined in claim 1, wherein said lock means comprises protruding means at the abutting surface of one of said split ends registering with recess means in the abutting surface of the other split end, and means transversely movable with respect to said recess for automatically providing lock engagement with said protruding means, said protruding means being a threaded stud, and said transversely movable means being a bayonet type plate nut assemblage providing locking engagement in axial movement of said stud into said recess means, and part of said assemblage protruding outwardly of said one side of the insert facilitating transverse movement of said assemblage for disengagement from said stud.

20. A run-flat insert for inflatable tires as defined in claim 19, wherein said threaded stud is anchored in said insert by means of a spring plate nut.

21. A run-flat insert for inflatable tires as defined in claim 19, wherein said threaded stud is anchored in said insert by means of an enlarged cylindrical member extending transversely of said insert and having a central threaded passage receiving said stud.

22. A run-flat insert for inflatable tires as defined in claim 1, wherein said ring member is of a dimension to protrude a substantial radial distance beyond the rim flanges, and is intended to provide an essential load bearing function in run-flat driving with conventional, thin side-walled tires.

23. A run-flat insert for inflatable tires as defined in claim 1, wherein said ring member is of a dimension to protrude only a slight radial distance beyond said rim flanges, and is of a width to provide essentially a bead-seating function during run-flat operation with especially designed, heavy side-walled, run-flat tires on standard one-piece drop center wheels.

24. A run-flat insert for inflatable tires as defined in claim 23, wherein said ring member is of irregular cross-sectional contour to provide an annular bead receiving recess at one side thereof adjacent the inner periphery, and an annular protrusion beyond the outer periphery in alignment with said recess, whereby during run-flat operation a load-bearing force will deform said ring member and partially close said annular recess through the zone of road contact of a deflated tire.

* * * * *